(12) United States Patent
Fuchs

(10) Patent No.: US 10,541,835 B2
(45) Date of Patent: Jan. 21, 2020

(54) METHOD FOR INITIALIZING A BUS SYSTEM WITH AUTOMATIC CLOSURE AFTER A PREDEFINED PERIOD OF TIME, AND BUS SYSTEM FOR PERFORMING THE METHOD

(71) Applicant: SEW-EURODRIVE GMBH & CO. KG, Bruchsal (DE)

(72) Inventor: Manuel Fuchs, Kronau (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 16/098,666

(22) PCT Filed: Feb. 2, 2017

(86) PCT No.: PCT/EP2017/025018
§ 371 (c)(1),
(2) Date: Nov. 2, 2018

(87) PCT Pub. No.: WO2017/190843
PCT Pub. Date: Nov. 9, 2017

(65) Prior Publication Data
US 2019/0149356 A1    May 16, 2019

(30) Foreign Application Priority Data
May 2, 2016 (DE) .......... 10 2016 005 312

(51) Int. Cl.
*G06F 3/00* (2006.01)
*H04L 12/403* (2006.01)
(Continued)

(52) U.S. Cl.
CPC ...... *H04L 12/403* (2013.01); *H04L 12/40019* (2013.01); *H04L 41/0622* (2013.01); *H04L 41/0627* (2013.01); *H04L 41/0631* (2013.01)

(58) Field of Classification Search
CPC ............. H04L 12/403; H04L 41/0631; H04L 41/0627; H04L 12/40019; H04L 41/0622
See application file for complete search history.

(56) References Cited

U.S. PATENT DOCUMENTS

| 4,667,323 A | * | 5/1987 | Engdahl | H04L 12/417 370/451 |
| 5,029,334 A | * | 7/1991 | Braun | H04B 3/542 370/252 |

(Continued)

FOREIGN PATENT DOCUMENTS

| DE | 102010002758 A1 | 9/2011 |
| DE | 112014001621 T5 | 12/2015 |

OTHER PUBLICATIONS

International Preliminary Report on Patentability issued in International Application No. PCT/EP2017/025018, dated Nov. 6, 2018 (8 pages total).

(Continued)

*Primary Examiner* — Jing-Yih Shyu
(74) *Attorney, Agent, or Firm* — Hunton Andrews Kurth LLP

(57) ABSTRACT

In a method for initializing a bus system, and a bus system having a master module and serially disposed bus subscribers, the master module asks the bus subscribers to log into the master module. After logging into the master module, each bus subscriber waits a predefined period of time to see whether a further bus subscriber logs into the master module, and closes the bus system if no further bus subscriber logs into the master module within the predefined period of time.

21 Claims, 4 Drawing Sheets

(51) Int. Cl.
*H04L 12/40* (2006.01)
*H04L 12/24* (2006.01)

(56) References Cited

U.S. PATENT DOCUMENTS

| | | | | |
|---|---|---|---|---|
| 5,093,828 | A * | 3/1992 | Braun | H04B 3/54 |
| | | | | 370/451 |
| 5,535,336 | A | 7/1996 | Smith et al. | |
| 6,160,795 | A * | 12/2000 | Hosemann | H04L 41/00 |
| | | | | 370/256 |
| 7,251,740 | B2 * | 7/2007 | Newman | H03K 3/0375 |
| | | | | 326/62 |
| 2009/0125656 | A1 | 5/2009 | Haas et al. | |
| 2014/0281081 | A1 | 9/2014 | Lunadier et al. | |
| 2016/0062930 | A1 | 3/2016 | Kijima | |
| 2016/0254925 | A1 * | 9/2016 | Riedel | G06F 13/4068 |
| | | | | 710/110 |
| 2017/0192929 | A1 * | 7/2017 | Biskup | G06F 13/4282 |

OTHER PUBLICATIONS

International Search Report dated Mar. 23, 2017, in International Application No. PCT/EP20171025018 (English-language translation).

\* cited by examiner

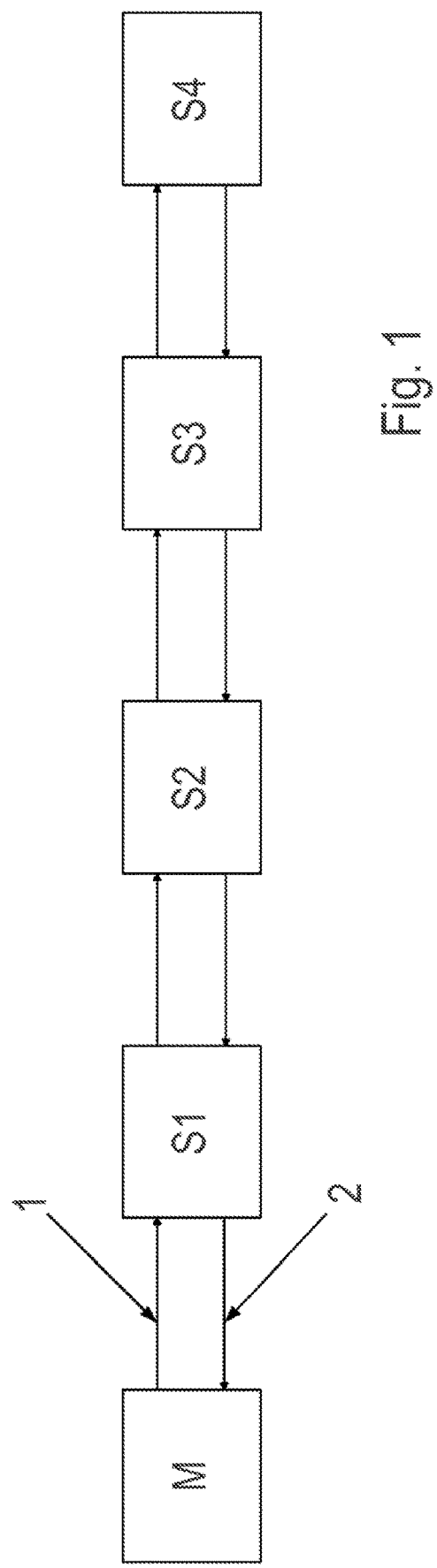

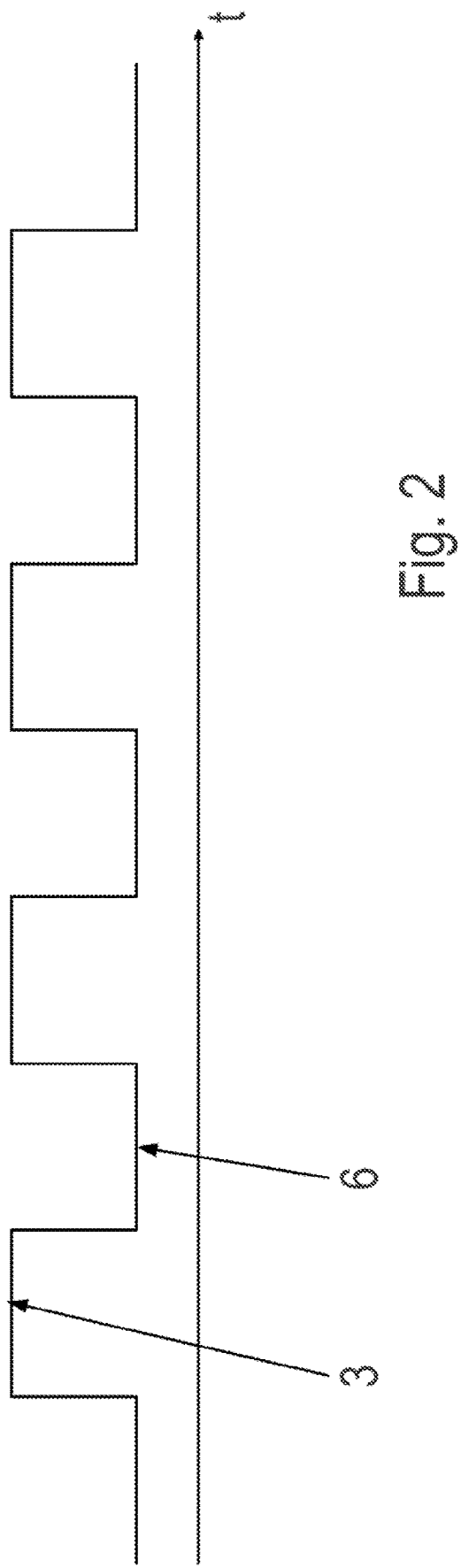

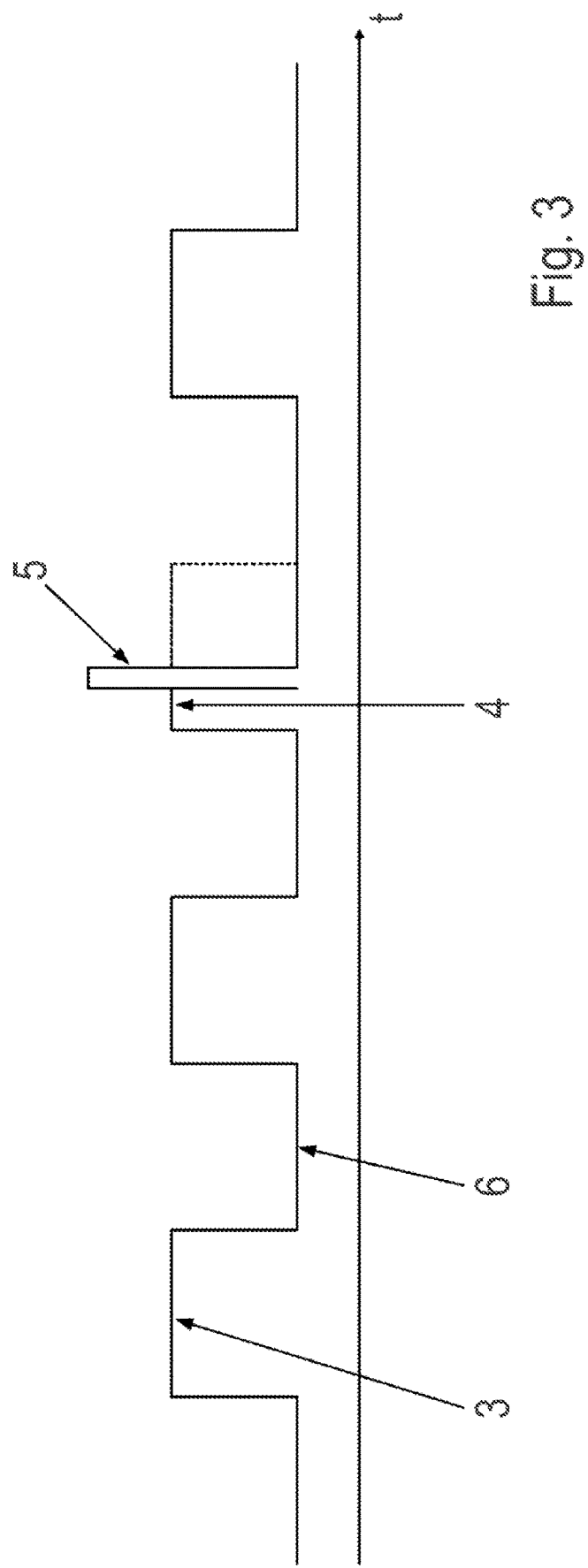

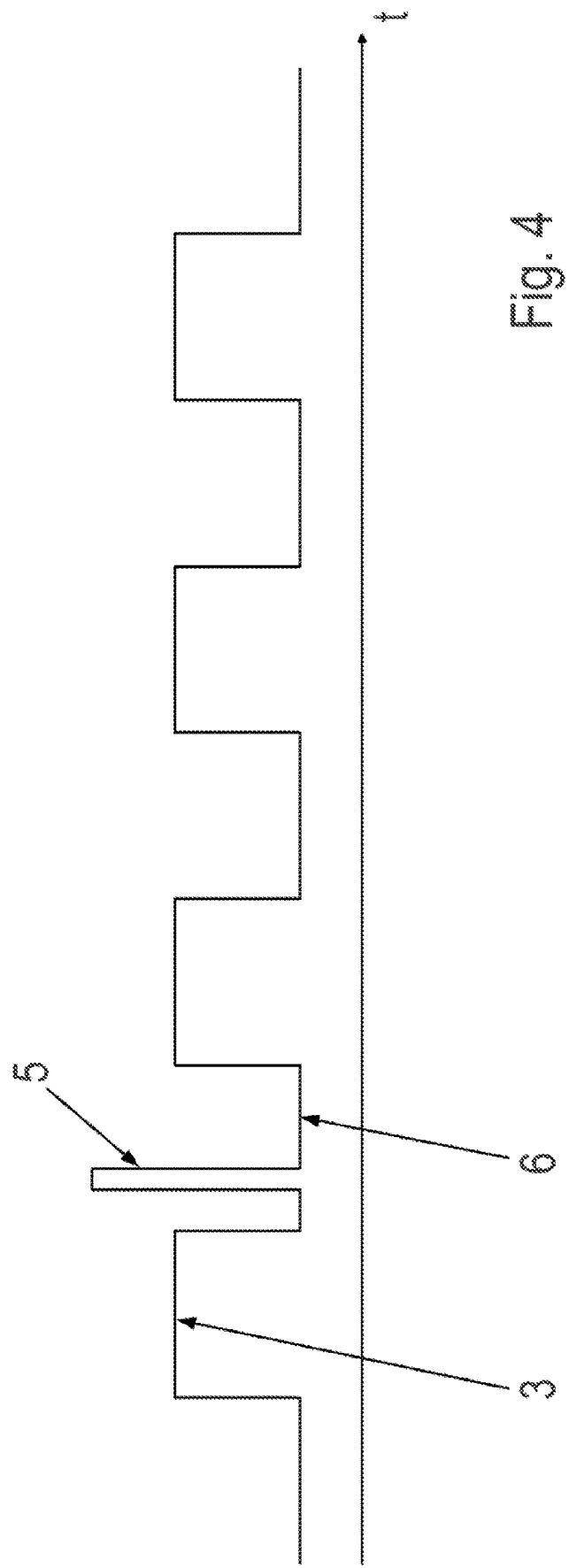

METHOD FOR INITIALIZING A BUS SYSTEM WITH AUTOMATIC CLOSURE AFTER A PREDEFINED PERIOD OF TIME, AND BUS SYSTEM FOR PERFORMING THE METHOD

FIELD OF THE INVENTION

The present invention relates to a method for initializing a bus system and to a bus system.

BACKGROUND INFORMATION

Data lines of certain bus systems require a terminating impedance when they have a linear topology. A terminating impedance is necessary even at each end of the data line.

U.S. Pat. No. 5,535,336 describes a network of bus subscribers with dynamic addressing.

German Published Patent Application No. 10 2010 002 758 describes a bus building-technology system having a daisy-chain topology.

SUMMARY

Example embodiment of the present invention provide a method for initializing a bus system and a bus system, in which the safety is improved.

According to an example embodiment of the present invention, a method for initializing a bus system, which has a master module and serially disposed bus subscribers, includes the following temporally successive method steps: in a first method step, the master module asks the bus subscribers to log in to the master module, in a second method step, a first bus subscriber downstream from the master module logs in to the master module, in a third method step, the first bus subscriber waits for a predefined period of time to see whether a second bus subscriber downstream from the first bus subscriber logs in to the master module, and in a fourth method step, the first bus subscriber closes the bus system if no second bus subscriber logs in to the master module within the predefined period of time, or in which in a fourth method step, in particular an alternative method step, a second bus subscriber logs in to the master module within the predefined period of time and waits for a further predefined period of time to see whether a third bus subscriber, downstream from the second bus subscriber, logs in to the master module, and the second bus subscriber closes the bus system if no third bus subscriber logs in to the master module within the further predefined period of time.

This has the advantage that the bus system automatically initializes itself with the aid of the present method. The bus system recognizes which one is the bus subscriber at the greatest distance from the master module, and this bus subscriber automatically closes the bus system. This relieves an operator of the bus system from connecting a terminating impedance within the system. The safety is improved as a result.

The predefined periods of time may be adaptable to the bus subscribers, so that there is a sufficient wait to allow a bus subscriber that needs a longer period of time for the activation to log in safely as well.

In a fifth method step, a fourth bus subscriber downstream from the first bus subscriber and/or the second bus subscriber may transmit a login to the master module after all predefined periods of time have elapsed, and in a sixth method step, the first bus subscriber or the second bus subscriber may open the bus system and may forward the login of the fourth bus subscriber to the master module. This offers the advantage that a bus subscriber that requires a longer period of time for the activation is easily able to be retroactively logged in.

A release may be granted to the bus system in a fifth method step, in particular by a control superordinate to the master module. This has the advantage that after a successful initialization, the bus system receives an external release in an additional method step with the aid of the release. The bus system transitions to a production mode in which the bus subscribers are actuated by the master module only after the release.

A fourth bus subscriber, downstream from the first bus subscriber and/or the second bus subscriber, may transmit a login to the master module in a sixth method step after all predefined time periods have elapsed, the first bus subscriber or the second bus subscriber blocking the login of the fourth bus subscriber to the master module in a seventh method step. This has the advantage that in the production mode, i.e. after the granted release, no bus subscriber is admitted to the bus system. The admittance to the bus system may be blocked with the aid of an upstream bus subscriber, thereby reducing the loading of the master module. In this manner, the security is improved.

In an eighth method step, the release of the bus system may be revoked, in particular by a control superordinate to the master module, and in a ninth method step, the first bus subscriber or the second bus subscriber may forward the login of the fourth bus subscriber to the master module. This offers the advantage that the fourth bus subscriber is automatically admitted to the bus system in a new startup of the bus system.

In a tenth method step, the fourth bus subscriber may wait a predefined period of time to see whether a bus subscriber downstream from the fourth bus subscriber logs in to the master module, and in an eleventh method step, the fourth bus subscriber may close the bus system if no bus subscriber downstream from the fourth bus subscriber logs in to the master module within the predefined period of time. This has the advantage that when a late bus subscriber, in particular the fourth bus subscriber, has logged in to the bus system, this bus subscriber automatically checks whether it is the bus subscriber most remote from the master module, in particular the last bus subscriber, and closes the bus system as the case may be.

The following temporally successive method steps may be carried out for the allocation of addresses to the bus subscribers: in a method step, the master module allocates a first address to a first bus subscriber and transmits this first address to the first bus subscriber, the first address in particular being a natural number n, the first address in particular being 0 or 1, in a following method step, the first bus subscriber increments the first address by one and allocates it to a second bus subscriber as the second address and transmits this second address to the second bus subscriber, the second address in particular being the natural number (n+1), and in a further method step, the second bus subscriber logs in to the master module with its second address.

This has the advantage that the assignment of the addresses to the bus subscribers takes place automatically. As a result, the initialization of the bus system is able to be executed in a safe and rapid manner.

During the addressing, a data packet may pass an inactive bus subscriber so that the next active bus subscriber of the bus system receives the address and uses it to log in to the master module.

In a fourth method step, the second bus subscriber may increment the second address by one and may allocate this address to a third bus subscriber as the third address and may transmit this third address to the third bus subscriber, the third address in particular being the natural number (n+2), and in a fifth method step, the third bus subscriber may log in to the master module using its third address. This has the advantage that each bus subscriber, in particular each active bus subscriber, is automatically able to be addressed with the aid of the present method.

The address m may be allocated to an $m^{th}$ bus subscriber in a further method step, and the $m^{th}$ bus subscriber may log in to the master module using the address m, m being a natural number, and m in particular being unequal to n, m in particular being equal to 15, and the $m^{th}$ bus subscriber may allocate the address m to a bus subscriber downstream from the $m^{th}$ bus subscriber, and may transmit the address m to the downstream bus subscriber, the $m^{th}$ bus subscriber in particular not incrementing the address, (m−1) being the maximally possible number of bus subscribers in the bus system. This has the advantage that the number of the bus subscribers is able to be limited. Data packets do not become too long in this manner, and the transmission speed is improved. The number of bus subscribers may be automatically restricted.

The master module may abort the method and may transmit an error report when a bus subscriber using the address m logs in to the master module. This has the advantage that the bus system automatically recognizes when too many bus subscribers are logging in. The error report may be sent to a superordinate control. The master module may generate a warning signal, in particular a warning tone or a warning light.

The following temporally successive method steps may be carried out for the emergency shutdown of the bus system: in a first method step, a bus subscriber and/or the master module recognize(s) an error status, in a second method step, the bus subscriber and/or the master module transmit(s) an emergency signal to all bus subscribers and to the master module, in a third method step, a further bus subscriber receives the emergency signal, immediately forwards it to an adjacent bus subscriber and simultaneously evaluates it, and in a fourth method step, the further bus subscriber shuts itself down.

This has the advantage that all bus subscribers of the bus system are able to be shut down within a short period of time. The emergency signal may be not fully evaluated right away but may be simultaneously forwarded to all bus subscribers and to the master module as soon as it has been identified as an emergency signal.

The emergency signal may interrupt a data packet. This has the advantage that the emergency signal is immediately sent to all bus subscribers and to the master module as soon as the error status has been identified. There may be no need to wait until the data packet has been transmitted in its entirety. As a result, a rapid shutdown of all bus subscribers is possible, and the security is improved.

The transmission of the interrupted data packet may not be continued and the interrupted data packet may be discarded. This has the advantage that an error that occurs in the data packet due to the interruption has no effect on the bus system. The security is therefore improved.

All data packets may have an identical length, in particular signal length, and the length of the emergency signal, in particular the signal length, may be shorter than the length of the data packets. This has the advantage that the emergency signal is able to be transmitted faster than a data packet. As a result, the security is improved.

Two consecutive data packets may be temporally spaced apart from each other by a transmission pause, and the emergency signal may interrupt a transmission pause. This has the advantage that the emergency signal may be transmitted immediately and independently of the status of the data line. The emergency signal may be transmittable at any time, regardless of whether a data packet just happens to be transmitted or a transmission pause exists at the time when the emergency signal is transmitted.

The emergency signal may be shorter than the transmission pause.

The bus system may have two data lines, the bus subscriber and/or the master module transmitting the emergency signal simultaneously with the aid of both data lines. This has the advantage that the emergency signal reaches all bus subscribers in a communications ring faster when it is transmitted with the aid of the two data lines in two opposite directions than when the emergency signal is transmitted by only one data line in one direction.

According to an example embodiment of the present invention, a bus system is adapted to be initialized using a method for initializing a bus system as previously described, the bus system including a master module and bus subscribers, which are disposed in series, the master module and the bus subscribers being connected to one another with the aid of at least one data line.

This has the advantage that the bus system is automatically able to be initialized with the aid of the present method. The bus system is adapted to recognize which one is the bus subscriber at the greatest distance from the master module. This bus subscriber is arranged to close the bus system automatically. This reduces the loading of an operator of the bus system because the operator does not have to connect a terminating impedance within the system. This improves the security.

The bus system may have at least one first data line and one second data line. This offers the advantage that a data packet is able to be sent from the master module to the bus subscribers with the aid of the first data line, and a data packet is able to be sent from a respective bus subscriber to the master module with the aid of the second data line, in particular at the same time. The speed of the data transmission is thus increased and the security improved. For the closing of the bus system, the first data line may be connected to the second data line by the last bus subscriber, in particular short-circuited. The first and the second data line form a communications ring.

A data packet may be transmittable from the master module to the bus subscribers using the first data line. This has the advantage that the first data line and the second data line may be disposed in parallel. Data packets may be transmittable at any time from the master module to the bus subscribers using the first data line. As a result, the data transmission from the master module to the bus subscribers will not be interrupted in order to transmit a respective data packet from an individual bus subscriber to the master module.

A respective data packet may be transmitted from an individual bus subscriber to the master module with the aid of the second data line. This has the advantage that the first data line and the second data line may be placed in parallel.

Data packets may be transmittable from a respective bus subscriber to the master module at any time via the second data line. As a result, the data transmission from the bus subscribers to the master module will not be interrupted in order to transmit a data packet from the master module to an individual bus subscriber.

The respective data line may have at least one data cable in each case, and each bus subscriber may be connected by a respective data cable to the bus subscriber upstream or downstream from it or to the master module. This has the advantage that the respective data line may have a modular configuration. As a result, a further bus subscriber is easily connected to the bus system with the aid of a further data cable.

Each data cable may have two mating plug connector parts and each bus subscriber may have a first plug connector part for the connection to the respective upstream bus subscriber with the aid of an individual data cable, and each bus subscriber may have a second plug connector part for the connection to the respective downstream bus subscriber. This has the advantage that the bus subscribers of the bus system are easily connected to each other in a reversible manner. As a result, a further bus subscriber is easily connectable to the bus system, or a bus subscriber is easily separated from its upstream bus subscriber and/or from its downstream bus subscriber.

The respective data cable of the first data line and the respective data cable of the second data line may be disposed between two adjacent bus subscribers in a cable sheath, the cable sheath in particular surrounding the data cables in the circumferential direction, in particular enveloping it. This has the advantage of reducing the wiring expense. The first and the second data line may be connected by a shared plug connector part so that only one plug connector part has to be plugged into the bus subscriber in order to connect a bus subscriber to its upstream or downstream bus subscriber. The plug connection may be implementable in a manner that prevents a polarity reversal.

A supply line and/or a ground lead for the bus subscribers may be disposed in the cable sheath. This has the advantage of reducing the wiring expense. The data cables and the supply line and/or the ground lead may be connected to a shared plug connector part so that only one plug connector part is to be plugged into the bus subscriber in order to connect a bus subscriber to its upstream or downstream bus subscriber. The plug connection may be implementable in a manner that prevents a polarity reversal.

Each bus subscriber may have a switch, which is connected to a respective data line, the switch being configured to interrupt the data transmission along the respective data line. This has the advantage that the individual bus subscriber is configured to use the switch to stop data packets that are not meant to reach the master module. In this manner, the bus subscriber relieves the load of the master module.

Each bus subscriber may have a time-measurement device. This has the advantage that the time-measurement device allows the individual bus subscriber to measure a time span within which a further bus subscriber responds to a data packet, and in particular sends a further data packet. The further data packet is thus able to be evaluated as a function of this time span, in particular is able to be blocked by the switch. This relieves the loading of the master module.

Each bus subscriber may have a logic circuit, and the logic circuit in particular may make it possible to evaluate data packets of the master module and/or of the bus subscribers. This offers the advantage that the switch and/or the time-measurement device is/are able to be actuated with the aid of the logic circuit, in particular as a function of a data packet.

The respective logic circuit may have a storage device, which may be used for storing data packets. As a result, a data packet that was stopped by a bus subscriber may be stored by its storage device and may be transmitted to the master module and/or to a bus subscriber at a later point in time.

Each bus subscriber may have an electronic circuit, the electronic circuit including the switch and/or the time-measurement device and/or the logic circuit, the switch and/or the time-measurement device and/or the logic circuit in particular being integrated into the electronic circuit. This has the advantage that the electronic circuit may have a compact and reliable configuration.

Further features and aspects of example embodiments of the present invention are described in greater detail below with reference to the appended Figures.

BRIEF DESCRIPTION OF THE DRAWINGS

FIG. 1 is a schematic view of a bus system according to an example embodiment of the present invention.

FIG. 2 shows the time characteristic of data packets on a data bus.

FIG. 3 shows the time characteristic of data packets and an emergency signal on the data bus in a first case example.

FIG. 4 shows the time characteristic of data packets and an emergency signal on the data bus in a second case example.

DETAILED DESCRIPTION

The bus system according to an example embodiment of the present invention has a master module M and bus subscribers (S1, S2, S3, S4), which are disposed in series and connected to one another. The bus system has a first bus subscriber S1 disposed downstream from master module M. The bus system has a second bus subscriber S2 downstream from first bus subscriber S1, first bus subscriber S1 being situated upstream from second bus subscriber S2. Second bus subscriber S2 is disposed upstream from a third bus subscriber S3, and third bus subscriber S3 is situated downstream from second bus subscriber S2. Third bus subscriber S3 is disposed upstream from a fourth bus subscriber S4, and fourth bus subscriber S4 is disposed downstream from third bus subscriber S3.

A bus subscriber (S1, S2, S3, S4) situated downstream from another bus subscriber (S1, S2, S3, S4) is situated at a greater distance from master module M in the direction of the series arrangement than the other bus subscriber (S1, S2, S3, S4). The other bus subscriber (S1, S2, S3, S4), which is disposed at a shorter distance from master module M than the bus subscriber (S1, S2, S3, S4) in the direction of the series arrangement, is located upstream from the bus subscriber (S1, S2, S3, S4).

For example, the bus system is an industrial plant which has various devices as bus subscribers (S1, S2, S3, S4), such as drives or electronic components, e.g., drive converters for electric motors.

The data bus has a first data line 1 and a second data line 2, which in each case serially connect the bus subscribers (S1, S2, S3, S4) and master module M to one another.

With the aid of first data line 1, master module M sends data packets (3, 4) such as control commands to the bus subscribers (S1, S2, S3, S4). With the aid of second data line 2, the bus subscribers (S1, S2, S3, S4) send data packets (3, 4) such as status information to master module M.

Each bus subscriber (S1, S2, S3, S4) has a first interface and a second interface, which may be arranged as a plug connector part in each case. Each data line (1, 2) has at least one data cable. Each data cable has a first mating plug connector part and at least one second mating plug connector part for a data transmission between the bus subscribers (S1, S2, S3, S4) along the respective data line (1, 2).

As a result, each bus subscriber (S1, S2, S3, S4) is able to be connected to a second plug connector part of an upstream bus subscriber (S1, S2, S3, S4) using a first plug connector part and the respective data cable, and it is able to be connected by a second plug connector part and the respective data cable to a first plug connector part of a downstream bus subscriber (S1, S2, S3, S4).

The respective data cable of first data line 1 and the respective data cable of second data line 2 may be guided in a shared cable sheath. A supply line and/or a ground lead for the bus subscribers (S1, S2, S3, S4) may also be disposed in this cable sheath.

Each bus subscriber (S1, S2, S3, S4) has a switch, in particular an electronic circuit, which is connected to the respective data line (1, 2). The switch may be used to interrupt the data transmission along the respective data line (1, 2).

Each bus subscriber (S1, S2, S3, S4) has a time-measurement device, in particular a timer. The time-measurement device may be integrated into the electronic circuit of the bus subscriber (S1, S2, S3, S4).

Using the electronic circuit, the data transmission along the respective data line (1, 2) is therefore able to be interrupted after a predefined time has elapsed.

Each bus subscriber (S1, S2, S3, S4) has a logic circuit. The logic circuit may be integrated into the electronic circuit of the bus subscriber (S1, S2, S3, S4).

Using the logic circuit, data packets on the data bus are able to be evaluated, and the sender of a data packet, in particular, is identifiable.

In the event that a bus subscriber (S1, S2, S3, S4) is inactive, a data packet is forwarded without interruption and without a time delay through the inactive bus subscriber (S1, S2, S3, S4) to the downstream or upstream bus subscriber (S1, S2, S3, S4). A data packet passes through an inactive bus subscriber (S1, S2, S3, S4) without obstruction.

The data bus may be implemented in a digital form.

For the initialization of the bus system, master module M sends a request to the bus subscribers (S1, S2, S3, S4) situated downstream to log in to master module M. An active bus subscriber (S1, S2, S3, S4) downstream from master module M logs in to master module M and forwards the request for the login to master module M to bus subscribers (S1, S2, S3, S4) downstream from it. The logged in bus subscriber (S1, S2, S3, S4) then waits for a predefined period of time to see whether a bus subscriber (S1, S2, S3, S4) downstream from it logs in to master module M.

If no downstream bus subscriber (S1, S2, S3, S4) logs in to the master module, then the last logged in bus subscriber (S1, S2, S3, S4) closes the bus system as soon as the predefined period of time has elapsed, by connecting first data line 1 and second data line 2 to each other, in particular short-circuiting them. A data packet that is transmitted with the aid of first data line 1 from master module M to the bus subscribers (S1, S2, S3, S4) is thus forwarded into second data line 2 at the final bus subscriber (S1, S2, S3, S4) and routed back to the master module.

The last bus subscriber (S1, S2, S3, S4) is the particular bus subscriber (S1, S2, S3, S4) that logs in last to master module M and has no downstream bus subscribers (S1, S2, S3, S4).

The request to log in to master module M is routed through an inactive bus subscriber (S1, S2, S3, S4) without this bus subscriber itself logging in to master module M.

After the bus system has been closed, a release is granted by a superordinate control or by an operator and the operation of the bus system begins.

In the event that a bus subscriber (S1, S2, S3, S4) logs in late, i.e. after the predefined period of time after the login of the last bus subscriber (S1, S2, S3, S4) has elapsed, then this bus subscriber (S1, S2, S3, S4) sends a data packet to master module M. If a release was already granted, this data packet is stopped by an upstream bus subscriber (S1, S2, S3, S4) that is logged in to master module M and will not be forwarded to master module M.

As soon as the release has been revoked, a data packet of the late bus subscriber (S1, S2, S3, S4) is forwarded to master module M and the late bus subscriber (S1, S2, S3, S4) is admitted to the bus system.

In the event that the late bus subscriber (S1, S2, S3, S4) has no downstream bus subscribers (S1, S2, S3, S4) that are logged in to master module M, then it becomes the new last bus subscriber (S1, S2, S3, S4) and closes the bus system after waiting out the predefined period of time for the login of a bus subscriber (S1, S2, S3, S4).

The predefined period of time for the login of a bus subscriber (S1, S2, S3, S4) is able to be adapted to the bus subscribers (S1, S2, S3, S4). The period of time may be selected such that bus subscribers (S1, S2, S3, S4) that have a longer start-up time are reliably logged in to master module M.

During the initialization of the bus system, bus addresses for the bus subscribers (S1, S2, S3, S4) are automatically assigned. For this purpose, master module M sends the bus address "1" to first bus subscriber S1. First bus subscriber S1 logs in to master module M using this bus address and increments the bus address by 1 and forwards it to its downstream bus subscriber (S1, S2, S3, S4). The downstream bus subscriber (S1, S2, S3, S4) logs in to master module M using the incremented bus address, i.e. bus address "2" in this instance, increments this bus address by 1 again and forwards it to its downstream bus subscriber (S2, S3, S4).

In an effort to restrict the number of bus subscribers (S1, S2, S3, S4) in the bus system, a bus subscriber (S1, S2, S3, S4) that is given a bus address that is greater than the maximally allowed number of bus subscribers (S1, S2, S3, S4), will not further increment this bus address but forwards the same bus address to its downstream bus subscriber (S1, S2, S3, S4), which uses this bus address to log in to master module M. As soon as master module M receives a bus address that is greater than the maximally allowed number of bus subscribers (S1, S2, S3, S4), master module M aborts the initialization of the bus system and transmits an error report to a control superordinate to master module M.

If a bus subscriber (S1, S2, S3, S4) that is not yet active, i.e. an inactive bus subscriber (S1, S2, S3, S4), receives a bus address from a bus subscriber (S1, S2, S3, S4) upstream from it or from master module M, then this bus address is looped through the inactive bus subscriber (S1, S2, S3, S4) without being incremented, and assigned to a downstream bus subscriber (S1, S2, S3, S4).

FIGS. 2 through 4 show the time characteristic of data packets 3 that are transmitted with the aid of a respective data line (1, 2). Each data packet 3 has a predefined length that is a function of the number of bus subscribers (S1, S2, S3, S4) of the bus system.

The data transmission is interrupted for a predefined period of time between two temporally successive data packets 3, which means that two temporally successive data packets 3 are temporally spaced apart with the aid of a transmission pause 6.

As soon as a bus subscriber (S1, S2, S3, S4) or master module M detects an error, data packet 4 transmitted at that instant is immediately interrupted and an emergency signal 5 is transmitted by the respective bus subscriber (S1, S2, S3, S4) or by master module M, as illustrated in FIG. 3. This emergency signal 5 causes an immediate shutdown of all bus subscribers (S1, S2, S3, S4).

The interrupted data packet 4 is immediately terminated and not further processed by the bus subscribers (S1, S2, S3, S4).

If a bus subscriber (S1, S2, S3, S4) or master module M detects an error during a transmission pause 6, then transmission pause 6 will be interrupted and an emergency signal 5 be sent by the respective bus subscriber (S1, S2, S3, S4) or by master module M, as illustrated in FIG. 4. This emergency signal 5 causes an immediate shutdown of all bus subscribers (S1, S2, S3, S4).

The respective bus subscriber (S1, S2, S3, S4) transmits emergency signal 5 on both data lines (1, 2). In other words, emergency signal 5 is transmitted from the respective bus subscriber (S1, S2, S3, S4) in the direction of master module M on the second data line and is transmitted by the respective bus subscriber (S1, S2, S3, S4) away from master module M on first data line 1.

The respective bus subscribers (S1, S2, S3, S4) immediately process the emergency signal 5 and at the same time forward it to the downstream bus subscriber (S1, S2, S3, S4) so that the bus subscribers (S1, S2, S3, S4) shut down immediately. In other words, emergency signal 5 is not first stored and processed but immediately forwarded to all bus subscribers (S1, S2, S3, S4) and to master module M.

The emergency signal 5 may have a shorter length than the data packets (3, 4) and/or transmission pause 6.

LIST OF REFERENCE CHARACTERS

M master module
S1 first bus subscriber
S2 second bus subscriber
S3 third bus subscriber
S4 fourth bus subscriber
1 first data line
2 second data line
3 data packet
4 data packet
5 emergency signal
6 transmission pause

The invention claimed is:

1. A method for initializing a bus system that includes a master module and bus subscribers arranged in series, comprising:
asking the bus subscribers, by the master module, to log in to the master module;
after the asking, logging in to the master module by a first bus subscriber downstream from the master module;
after the logging in, waiting, by the first bus subscriber, for a predefined period of time to ascertain whether a second bus subscriber downstream from the first bus subscriber logs in to the master module;
after the waiting, (a) closing the bus system, by the first bus subscriber, if no second bus subscriber logs in to the master module within the predefined period of time, and/or (b) logging in to the master module by a second bus subscriber within the predefined period of time and waiting for a further predefined period of time to ascertain whether a third bus subscriber downstream from the second bus subscriber logs in to the master module, the second bus subscriber closing the bus system if no third bus subscriber logs in to the master module within the further predefined period of time.

2. The method according to claim 1, wherein the closing includes short-circuiting a first data line with a second data line by a last bus subscriber.

3. The method according to claim 1, further comprising:
sending, by a fourth bus scriber downstream from the first bus subscriber and/or the second bus subscribe, a login to the master module after all predefined time periods have elapsed; and
opening, by the first bus subscriber or the second bus subscriber, the bus system and forwarding the login of the fourth bus subscriber to the master module.

4. The method according to claim 1, further comprising granting a release to the bus system.

5. The method according to claim 4, wherein the release is granted by a control superordinate to the master module.

6. The method according to claim 4, further comprising:
sending a login, by a fourth bus subscriber downstream from the first bus subscriber and/or the second bus subscriber, to the master module after all predefined time periods have elapsed; and
blocking, by the first bus subscriber or the second bus subscriber, the login of the fourth bus subscriber to the master module.

7. The method according to claim 6, further comprising:
revoking the release of the bus system; and
forwarding, by the first bus subscriber or the second bus subscriber, the login of the fourth bus subscriber to the master module.

8. The method according to claim 7, wherein the revoking is performed by a control superordinate to the master module.

9. The method according to claim 7, further comprising:
waiting, by the fourth bus subscriber, for a predefined period of time to ascertain whether a bus subscriber downstream from the fourth bus subscriber logs in to the master module; and
closing, by the fourth bus subscriber, the bus system if no bus subscriber downstream from the fourth bus subscriber logs in to the master module within the predefined period of time.

10. A bus system, comprising:
a master module and bus subscribers that are disposed in series; and
at least one data line connecting the master module and the bus subscribers;
wherein the bus system is adapted to perform the method recited in claim 1.

11. The bus system according to claim 10, wherein the bus system includes at least one first data line and at least one second data line.

12. The bus system according to claim 11, wherein the master module is adapted to transmit a data packet to the bus subscribers via the first data line, and/or individual bus subscribers are adapted to transmit a data packet to the master module via the second data line.

13. The bus system according to claim 11, wherein each data line includes at least one data cable, each bus subscriber being connected by an individual data cable to the bus subscriber upstream and/or downstream and/or to the master module.

14. The bus system according to claim 13, wherein each data cable includes two mating plug connector parts, each bus subscriber having a first plug connector part adapted to connect to a respective upstream bus subscriber and a second plug connector part adapted to connect to a downstream bus subscriber.

15. The bus system according to claim 13, wherein the individual data cable of the first data line and the individual data cable of the second data line are arranged between two adjacent bus subscribers in a shared cable sheath surrounding and/or enveloping the data cables in a circumferential direction.

16. The bus system according to claim 15, wherein a supply line and/or a ground lead for the bus subscribers are arranged in the shared cable sheath.

17. The bus system according to claim 10, wherein each bus subscriber includes a switch connected to a respective data line and adapted to interrupt data transmission along the respective data line.

18. The bus system according to claim 10, wherein each bus subscriber includes a time-measurement device.

19. The bus system according to claim 10, wherein each bus subscriber includes a logic circuit adapted to evaluate data packets of the master module and/or of the bus subscribers.

20. The bus system according to claim 10, wherein each bus subscriber includes an electronic circuit having a switch connected to a respective data line and adapted to interrupt data transmission along the respective data line, a time-measurement device, and/or a logic circuit adapted to evaluate data packets of the master module and/or of the bus subscribers.

21. The bus system according to claim 20, wherein the switch, the time-measurement device, and/or the logic circuit are integrated into the electronic circuit.

\* \* \* \* \*